Oct. 6, 1959  M. F. REIJNST ET AL  2,907,903
ROTOR HAVING A PLURALITY OF PERMANENT MAGNETS AT ITS PERIPHERY
Filed Oct. 14, 1957

INVENTORS
MAXIMILIEN FELIX REIJNST
WILHELMUS HENDRIKUS VAN DONSELAAR
BY
*Frank R. Trifari*
AGENT

2,907,903

ROTOR HAVING A PLURALITY OF PERMANENT MAGNETS AT ITS PERIPHERY

Maximilien Felix Reijnst and Wilhelmus Hendrikus Van Donselaar, Eindhoven, Netherlands, assignors to North American Philips Company Inc., New York, N.Y., a corporation of Delaware Application October 14, 1957, Serial No. 690,009

Claims priority, application Netherlands October 19, 1956

10 Claims. (Cl. 310—156)

This invention relates to rotors having a plurality of permanent magnets at their peripheries.

According to the invention, the magnets which are of material having a $H_c$ higher than 1000 oersted, have their poles of same polarity adjacent one another and, separated by pole plates, are located side by side in tangential direction, the magnets being fixed in radial direction by the direct support of and/or attachment to the pole plates, which in their turn are secured in a radial direction to the shaft of the rotor by means of extensions of non-magnetic material. By the choice of the magnetic material and the relative position of the magnetic poles, it is possible to build up a rotor having a large number of alternating poles without the need of a large pitch of the poles. On account of their large number, it is in this case no simple task to secure the magnets themselves directly to the shaft, for example by means of a screwed connection or an adhesive. Furthermore, the forces resulting from centrifugal action may be such that the magnets are required to be secured very rigidly. It would be possible to secure the magnets by means of a cylindrical supporting body surrounding the rotor and secured to the shaft. However, the air-gap between the rotor and a co-acting surrounding part is thus increased to an undesirable extent so that the advantage obtained with the structure according to the invention are partly lost again. Another solution might be to provide the pole plates with projections which on the sides of the rotor project from the magnets and are surrounded by an annular body which is secured to the shaft. However, the surface pressures which occur in this structure may become such that the constitutive material of the pole plates cannot withstand them. Furthermore in this construction, the pole plates are subject to bending stress as a result of the centrifugal forces occurring, so that the mechanical strength of the pole plates must in certain cases be greater than is desirable in a magnetic respect. By fixing the magnets in the radial direction by the direct support of and/or attachment to the pole plates, which pole plates in their turn are secured in radial direction to the shaft of the rotor by means of extensions of non-magnetic material, it is ensured in a simple manner that the magnets are secured to the shaft by the pole plates which are already available. For this purpose, only extensions of non-magnetic material are required.

According to another feature of the invention, the non-magnetic extensions may be secured to the shaft by means of a plurality of apertures, extending in the axial direction which are provided side by side on a hollow body in the tangential direction, a non-magnetic extension, the extremity of which is flanged over, reaching through each of these apertures. The hollow body may be either the shaft itself, which is hollow, or a sleeve secured to the shaft.

As an alternative, it is possible to achieve this attachment by means of a plurality of axial shaped grooves provided side by side on the shaft in the tangential direction a corresponding profile of the non-magnetic extension being located in each of said grooves.

However, the attachment is preferably obtained by means of a plurality of annular shaped grooves provided side by side on the shaft in the axial direction, corresponding projections of the non-magnetic extensions being located in said grooves. The advantage is thus obtained that tolerances in the tangential direction of the magnets and the pole plates cannot affect the attachment of the extensions to the shaft, since the annular shaped grooves on the shaft create the possibility of joining the pole plates and the magnets even in case of differences in their dimensions.

In order to secure the pole plates over their full width, the pole plates and their extensions of non-magnetic material are connected together, for example, by means of a welded or soldered joint.

It is alternatively possible for the pole plates and their extensions of non-magnetic material to be secured together by means of one or more dovetail or similar joints. In this manner also, the pole plates are held in position over their full width. As a matter of fact, in this case it is not necessary for this joint to have the form of a dovetail, it also being possible for circular or square projections of the pole plates to be located in corresponding recesses in the non-magnetic extensions. In case of large quantities, the last-mentioned connection is cheaper than a welded or soldered joint.

According to a further feature of the invention, each pole plate comprises two engaging laminations, each flanged on the outer side of the rotor and engaging at these flanged ends, the outer surfaces of the magnets. By building up each pole plate from two laminations, the thickness of each lamination is so small that the flange may be formed and also the recesses for the dovetail or similar connections may be provided by a single punching operation.

Examples of magnets having a coercive force ($H_c$) higher than 100 oersted are described in the U.S. Patent 2,762,778.

The material for the pole plates can be all rolled steel plate, for instance consisting of Fe, less than 0.1% C and 0.2–0.5% Mn.

To obtain proper attachment of the magnets, which have a flat shape and the thickness of which is somewhat increasing from the inner side of the rotor to the circumference, to the pole plates, they may be secured thereto by means of an adhesive. Furthermore, this results in the assembly of the rotor being simplified, since the rotor may be built up from individual units, each comprising a permanent magnet having each pole provided with a pole plate with extension which is adhered thereto.

If the attachment of the non-magnetic extensions to the shaft is obtained by means of a plurality of annular shaped grooves provided side by side on the shaft in the axial direction, which grooves accommodate corresponding projections of the non-magnetic extensions, it is necessary for the assembly that the grooves shall be interrupted in the axial direction at at least one area to enable the profiles of the non-magnetic extensions to be introduced into the grooves. This interruption itself can serve for the fixation of the pole plates of one or more magnets by arranging a wedge in the interruption between the extensions of the pole plates. It is thus possible for the space round the shaft to be filled up completely with magnets and pole plates. In this case, the size of the magnet arranged last may be chosen in conformity with the space still available.

A suitable adhesive for attaching the magnets to the pole plates are the well-known aethoxyline resins.

The invention also relates to the method of securing the non-magnetic extension of the rotor, in which the non-magnetic extensions are secured to the shaft by means of a plurality of annular shaped grooves which are provided side by side on the shaft in the axial direction and which accommodate corresponding cams of the non-magnetic extensions.

Preferably, individual units each comprising a permanent magnet having each pole provided with a pole plate with extension which is adhered thereto, are arranged in succession with their projections in the grooves of the shaft.

Examples of suitable materials for the non-magnetic extensions are:

(A) 62 to 65% Cu
0.2% Al, Fe and Sn and the balance Zn
(B) 17% Cr—0.015% C
8% Ni—0.75% Si; 0.03% P; 0.035% S; 0.6% Mn, and the balance Fe It is thus possible to prevent demagnetization of the magnets, which would be unavoidable in the absence of pole plates.

In order that the invention may be readily carried into effect, one embodiment will now be described more fully, by way of example, with reference to the accompanying drawing, in which.

Figure 1:
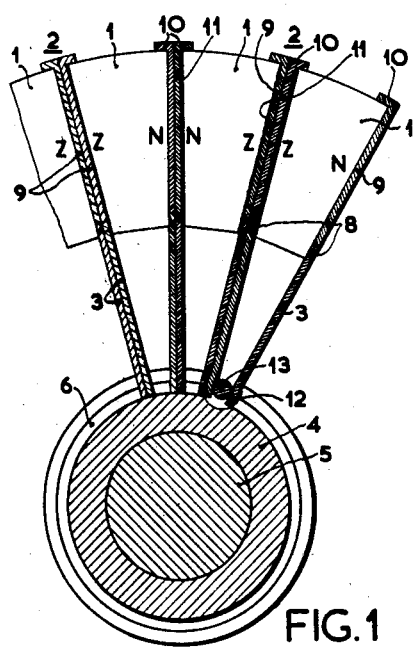
Fig. 1 is a sectional view at right angles to the shaft of the rotor according to the invention.

Fig. 1 shows a rotor comprising a plurality of permanent magnets 1 at its periphery, each magnet consisting of material having an $H_c$ higher than 1000 oersted. The magnets 1 are separated by pole plates 2. The magnets 1 are magnetized in the tangential direction and have their poles of same polarity adjacent one another, so that the pole plates 2 constitute alternately north and south poles at the periphery of the rotor. The pole plates 2 comprise extensions 3 of non-magnetic material, which are secured to a sleeve 4 seated on the shaft 5 of the rotor. To bring about this attachment, the sleeve 4 is provided with annular shaped grooves 6, which accommodates projections 7 of the extensions 3. Each pole plate 2 comprises two engaging laminations 9 each having a thickness of several millimetres, which are flanged at the outer side of the rotor and, at these flanged ends 10, engage the outer surfaces of the magnets. Furthermore, the magnets 1 are secured to the laminations 9 by means of an adhesive 11. The laminations 9 and the extensions 3 may be secured together by means of a dovetail joint 8. The annular shaped grooves 6 are interrupted in axial direction by means of a groove 12, in which the extensions 3 of one magnet are fixed in position by means of a wedge 13.

Figure 3:
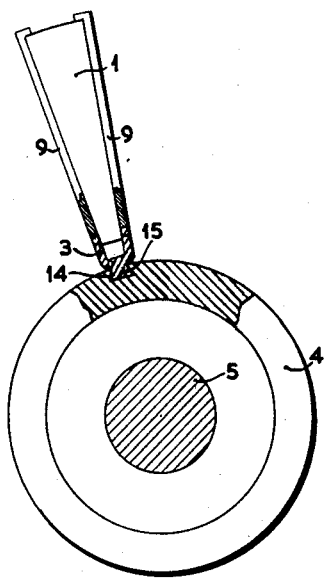
Fig. 3 is a sectional view at right angles to the shaft of the rotor according to the invention, in which the non-magnetic extensions are secured to the shaft in another possible way.
Figure 2:
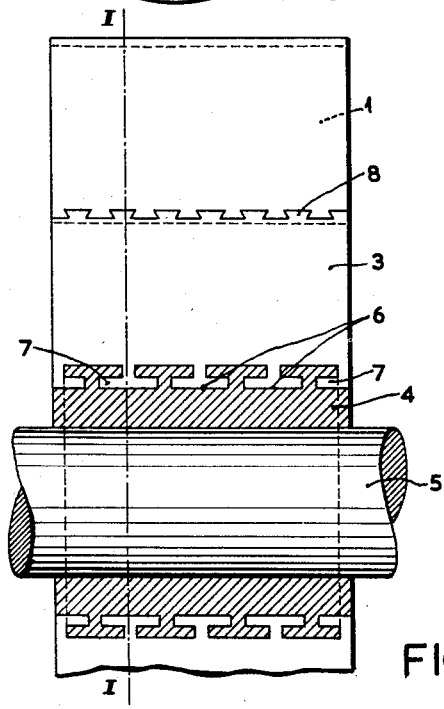
Fig. 2 is an elevation view in tangential direction of a unit comprising a permanent magnet having each pole provided with a pole plate with extension, which is adhered thereto.

In Fig. 3, the extensions 3 are secured to a sleeve 4 of large diameter. The sleeve 4 is provided with grooves 14, which accommodate a profile 15 of an extension 3 so that the extensions 3 can be shoved in axial directions in grooves 14 of dovetail shape.

Figure 4:
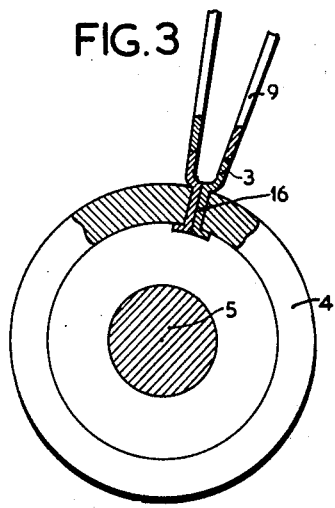
Fig. 4 is a modification of Fig. 3.

In Fig. 4 a sleeve 4 of large diameter is provided with apertures 16, through which the extensions 3 extends. At the inner side of the sleeve 4 the extensions are bowed and lie against the inner side of the sleeve 4.

The rotor according to the invention is assembled as follows:

Laminations 9 are secured to the extensions 3, for example by compression, whereupon a lamination 9 having an extension 3 is adherent to the poles of the magnets. The resultant units are now mounted on the shaft by introducing the projections 7 of the extensions 3 into the interruption 12 and subsequently moving on each unit in the tangential direction. A number of units are successively arranged on the shaft such that only the space determined by the groove 12 remains. Dependent upon the space available, a special unit is now manufactured, the length of the magnet plus the two laminations on each side thereof corresponding to the space which is still available. The last unit is pressed in the radial direction between the units already mounted and subsequently fixed in position by means of a wedge 13.

The rotor according to the invention is suitable for a permanent-magnetic brake operating on the eddy-current principle, for example for vehicles.

What is claimed is:

1. A rotor comprising a shaft, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, a pair of abutting pole plates disposed between and separating adjacent magnets, said magnets being secured to the pole plates, a plurality of radially-extending members of non-magnetic material each secured at one end to one of said pole plates and secured at the other end to said shaft whereby said magnets are securely positioned about the periphery of said shaft.

2. A rotor comprising a shaft, a hollow sleeve member covering said shaft, said sleeve member being provided with a plurality of axially-extending juxtaposed apertures, a plurality of permanent magnets radially disposed about said sleeve-member, each of said magnets being constituted of a material having a coercive force ($H_c$) greater than about 1000 oersted, said magnets being disposed side-by-side in a tangential direction with poles of like polarity adjacent one another, a pair of abutting pole plates disposed between and separating adjacent magnets, said magnets being secured to the pole plates, a plurality of radially-extending members of non-magnetic material each secured at one end to one of said pole plates and secured at the other end through one of said apertures to said shaft whereby said magnets are securely positioned about the periphery of said shaft.

3. A rotor comprising a shaft, a hollow sleeve-like member covering said shaft, said sleeve-like member having a plurality of axially-extending juxtaposed apertures opening into elongated slots in said sleeve member, a plurality of permanent magnets radially disposed about said shaft, each of said magnets being constituted of a material having a coercive force ($H_c$) greater than about 1000 oersted, said magets being disposed side-by-side in a tangential direction with poles of like polarity adjacent one another, a pair of abutting pole plates disposed between and separating adjacent magnets, said magnets being secured to the pole plates, a plurality of radially-extending members of non-magnetic material each secured at one to one of said pole plates, the other end of each of said radially-extending members being adapted to fit securely into one of said elongated slots whereby said magnets are securely positioned about the periphery of said shaft.

4. A rotor comprising a shaft, a sleeve-like member covering said shaft and having a plurality of axially-extending juxtaposed annular grooves partly covered by flange-like extensions of the outer surface of said sleeve-like member, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, a pair of abutting pole plates disposed between and separating adjacent magnets, said magnets being secured to and supported by the pole plates, a plurality of radially-extending members of non-magnetic material each secured at one end to one of said pole plates, the other end of each of said radially-extending members having a flange-like projection adapted to fit into one of the annular grooves of the sleeve-like member whereby said magnets are securely positioned about the periphery of said shaft.

5. A rotor comprising a shaft, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, a pair of abutting pole plates disposed between and separating adjacent magnets, said magnets being secured to the pole plates, a plurality of radially-extending members of non-magnetic material each soldered at one end to one of said pole plates and secured at the other end to said shaft whereby said magnets are securely positioned about the periphery of said shaft.

6. A rotor comprising a shaft, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, a pair of abutting pole plates disposed between and separating adjacent magnets, said magnets being secured to and supported by the pole plates, a plurality of radially-extending members of non-magnetic material each welded at one end to one of said pole plates and secured at the other end to said shaft whereby said magnets are securely positioned about the periphery of said shaft.

7. A rotor comprising a shaft, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, a pair of abutting pole plates disposed between and separating adjacent magnets, said magnets being secured to the pole plates, a plurality of radially-extending members of non-magnetic material each connected at one end to one of said pole plates by an interlocking joint and secured at the other end to said shaft whereby said magnets are securely positioned about the periphery of said shaft.

8. A rotor comprising a shaft, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, a pair of abutting pole plates disposed between and separating adjacent magnets, said magnets being secured to the pole plates, each of said pole plates having a flanged outer end portion adapted to engage and position said magnets, a plurality of radially-extending members of non-magnetic material each secured to one end to one of said pole plates and secured at the other end to said shaft whereby said magnets are securely positioned about the periphery of said shaft.

9. A rotor comprising a shaft, a plurality of permanent magnets radially disposed about said shaft, each of said magnets being constituted of a material having a coercive force ($H_c$) greater than about 1000 oersted, said magnets being disposed side-by-side in a tangential direction with poles of like polarity adjacent one another, a pair of abutting pole plates disposed between and separating adjacent magnets, said magnets being secured to the pole plates by an adhesive, a plurality of radially-extending members of non-magnetic material each secured at one end to one of said pole plates and secured at the other end to said shaft whereby said magnets are securely positioned about the periphery of said shaft.

10. A rotor comprising a shaft having a plurality of annular grooves and an axial groove therein, a plurality of permanent magnets radially disposed about said shaft, each of said magnets being constituted of a material having a coercive force ($H_c$) greater than about 1000 oersted, said magnets being disposed side-by-side in an tangential direction with poles of like polarity adjacent one another, a pair of abutting pole plates disposed between and separating adjacent magnets, said magnets being secured to and supported by the pole plates, a plurality of radially-extending members of non-magnetic material each secured at one end to each of said pole plates and positioned at the other end in one of said annular grooves, and means positioned in said axial groove to fixedly position said radially-extending members of non-magnetic material in said annular grooves whereby said magnets are securely positioned about the periphery of said shaft.

References Cited in the file of this patent

UNITED STATES PATENTS

| 2,734,140 | Parker | Feb. 7, 1956 |

FOREIGN PATENTS

| 104,872 | Switzerland | June 2, 1924 |

UNITED STATES PATENT OFFICE

CERTIFICATE OF CORRECTION

Patent No. 2,907,903                                          October 6, 1959

Maximilien Felix Reijnst et al.

It is hereby certified that error appears in the printed specification of the above numbered patent requiring correction and that the said Letters Patent should read as corrected below.

Column 2, line 39, for "higher than 100 oersted" read -- higher than 1000 oersted --; column 4, line 57, for "one to one" read -- one end to one --; column 6, line 30, for "in an tangential" read -- in a tangential --.

Signed and sealed this 8th day of March 1960.

(SEAL)
Attest:

KARL H. AXLINE                                               ROBERT C. WATSON
Attesting Officer                                      Commissioner of Patents